United States Patent
Zhou et al.

(10) Patent No.: US 12,051,349 B2
(45) Date of Patent: Jul. 30, 2024

(54) DISPLAY PANEL ADJUSTMENT METHOD, DISPLAY APPARATUS AND STORAGE MEDIUM

(71) Applicant: HKC CORPORATION LIMITED, Guangdong (CN)

(72) Inventors: Mancheng Zhou, Shenzhen (CN); Zhi Xiong, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/256,282

(22) PCT Filed: Jun. 24, 2022

(86) PCT No.: PCT/CN2022/101023
§ 371 (c)(1),
(2) Date: Jun. 7, 2023

(87) PCT Pub. No.: WO2023/060937
PCT Pub. Date: Apr. 20, 2023

(65) Prior Publication Data
US 2024/0054926 A1 Feb. 15, 2024

(30) Foreign Application Priority Data
Oct. 14, 2021 (CN) .......................... 202111199134.7

(51) Int. Cl.
*G09G 3/00* (2006.01)
*G06T 7/00* (2017.01)

(52) U.S. Cl.
CPC .............. *G09G 3/006* (2013.01); *G06T 7/97* (2017.01); *G06T 2207/10004* (2013.01); *G09G 2310/08* (2013.01)

(58) Field of Classification Search
CPC ................ G09G 2310/08; G09G 3/006; G06T 2207/10004; G06T 7/97
See application file for complete search history.

(56) References Cited

U.S. PATENT DOCUMENTS

| 2008/0266277 A1 | 10/2008 | Ichikura et al. |
| 2014/0347255 A1 | 11/2014 | Chiu et al. |
| (Continued) | | |

FOREIGN PATENT DOCUMENTS

| CN | 103106871 A | 5/2013 |
| CN | 105374317 A | 3/2016 |
| (Continued) | | |

OTHER PUBLICATIONS

International Search Report issued on Sep. 29, 2022, in corresponding International Application No. PCT/CN2022/101023, 6 pages.
(Continued)

*Primary Examiner* — Muhammad N Edun
(74) *Attorney, Agent, or Firm* — Maier & Maier, PLLC (57) ABSTRACT

A display panel adjustment method, display apparatus and storage medium. Detecting whether a persistence is created on a display panel by displaying a preset detection screen, locating all zones where a persistence has appeared in case where the persistence has been created on the display panel, and determining a target gate line which probably causes the persistence to appear on the display panel; by shortening the turn-on time of a target gate line, it is possible to decrease the probability of a parasitic capacitor being formed on the target gate line, or may decrease the charge held in the parasitic capacitor formed on the target gate line, and may further increase the discharge time of the parasitic capacitor, so as to mitigate or eliminate the persistence, and improve the display effect.

15 Claims, 7 Drawing Sheets

(56) References Cited

U.S. PATENT DOCUMENTS

| | | | | |
|---|---|---|---|---|
| 2015/0091851 A1* | 4/2015 | Reynolds | ............... | G06F 3/0445 |
| | | | | 345/174 |
| 2015/0091859 A1* | 4/2015 | Rosenberg | ............ | G06F 3/0442 |
| | | | | 345/174 |
| 2015/0091864 A1* | 4/2015 | Reynolds | ............ | G06F 3/04184 |
| | | | | 345/174 |
| 2016/0378208 A1* | 12/2016 | Shahparnia | ............ | G06F 3/0442 |
| | | | | 345/173 |
| 2021/0349601 A1* | 11/2021 | Chen | ................... | G06F 3/04166 |

FOREIGN PATENT DOCUMENTS

| | | | |
|---|---|---|---|
| CN | 105938703 | A | 9/2016 |
| CN | 106952628 | A | 7/2017 |
| CN | 108028034 | A | 5/2018 |
| CN | 108364600 | A | 8/2018 |
| CN | 108376530 | A | 8/2018 |
| CN | 109752870 | A | 5/2019 |
| CN | 110178173 | A | 8/2019 |
| CN | 111855149 | A | 10/2020 |
| CN | 212516499 | U | 2/2021 |
| CN | 112767877 | A | 5/2021 |
| CN | 112967661 | A | 6/2021 |
| CN | 112967662 | A | 6/2021 |
| CN | 112967664 | A | 6/2021 |
| CN | 113012626 | A | 6/2021 |
| JP | 2010156840 | | 7/2010 |
| KR | 20090062552 | A | 6/2009 |
| TW | I233080 | B | 5/2005 |

OTHER PUBLICATIONS

Written Opinion issued on Sep. 29, 2022, in corresponding International Application No. PCT/CN2022/101023, 4 pages.

* cited by examiner

DISPLAY PANEL ADJUSTMENT METHOD, DISPLAY APPARATUS AND STORAGE MEDIUM

CROSS-REFERENCE TO RELATED APPLICATIONS

This disclosure is a 35 U.S.C. § 371 national stage application of PCT application No. PCT/CN2022/101023, filed on Jun. 24, 2022, which claims the benefit of Chinese Patent Application No. 202111199134.7, entitled DISPLAY PANEL ADJUSTMENT METHOD, DISPLAY APPARATUS AND STORAGE MEDIUM, which was filed with China National Intellectual Property Administration on Oct. 14, 2021, and the entire contents of which are incorporated herein by reference.

TECHNICAL FIELD

The present disclosure relates to the field of display technology, and more particularly, relates to a display panel adjustment method, a display apparatus and a storage medium.

BACKGROUND

With the rapid development of the display technology, display panels are widely used in various fields such as entertainment, education, security and protection, and users are expecting better display effect of display panels.

In existing display panels, when an output of a gate line (i.e., a scan line) switches from a high-level signal to a low-level signal, the gate line is prone to residual voltage and a parasitic capacitor might be formed, which would probably make a switched-off LED (light emitting diode) connected to another gate line to turn on and emit light due to the parasitic capacitance coupling, such that a persistence might be created on portions of the display panel where should have remained dark, and the display effect would be affected.

SUMMARY

One objective of the embodiments of the present disclosure is to provide a display panel adjustment method, a display apparatus, and a storage medium, which intend to solve the existing problem that LED would probably turn on and emit light due to parasitic capacitance coupling such that a persistence might be generated on the display panel where should have remained dark and the display effect would be affected.

The technical solutions adopted in the embodiments of this disclosure are as follows:

A first aspect provides a display panel adjustment method, which includes:
driving a display panel to display a preset detection screen according to a preset detection screen signal;
detecting whether a persistence is created on the display panel;
locating all zones of the display panel where the persistence has appeared in case where the persistence has been created on the display panel, wherein each of the zones includes at least one row of pixels;
determining at least one target gate line corresponding to each of the zones, wherein each target gate line is used for driving a row of target pixels whose row number is smaller than a minimum row number of all rows of pixels in the corresponding zone; and
shortening a turn-on time of each target gate line.

A second aspect provides a display apparatus including a display panel, a memory, a processor, and a computer program stored in the memory and executable on the processor;
the memory, the processor and the display panel are sequentially connected, and the processor, when executing the computer program, implements steps of the display panel adjustment method provided by the first aspect of the embodiments of this disclosure.

A third aspect provides a computer-readable storage medium storing a computer program, which, when executed by a processor, implements steps of the display panel adjustment method provided by the first aspect of the embodiments of this disclosure.

The display panel adjustment method provided by the first aspect of the embodiments of this disclosure, may detect whether a persistence is created on the display panel by displaying a preset detection screen; and may locate all the zones where the persistence appears if the persistence is created on the display panel, and may determine a target gate line which would probably cause the persistence to appear on the display panel; and by shortening the turn-on time of the target gate line, the method may decrease the probability of a parasitic capacitor being formed on the target gate line, or may decrease the charge held in the parasitic capacitor formed on the target gate line; and may further increase the discharge time of the parasitic capacitor, so as to mitigate or eliminate the persistence, and improve the display effect.

It is understood that, relative description in the above aspect may be referred to for the benefits of the above second and third aspects, which will not be repeated here.

DETAILED DESCRIPTION OF THE EMBODIMENTS

First Embodiment

Figure 1:
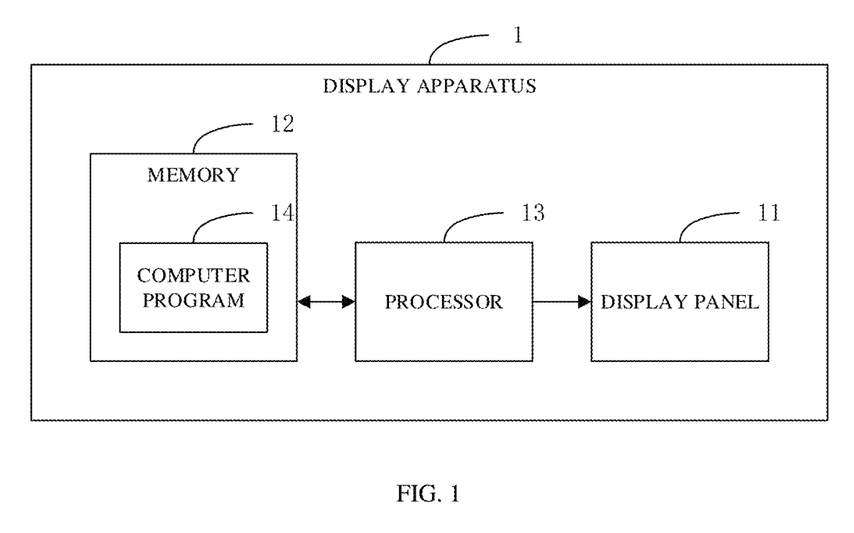
FIG. 1 is a schematic structural diagram of a display apparatus provided in a first embodiment of the present disclosure.
Figure 4:
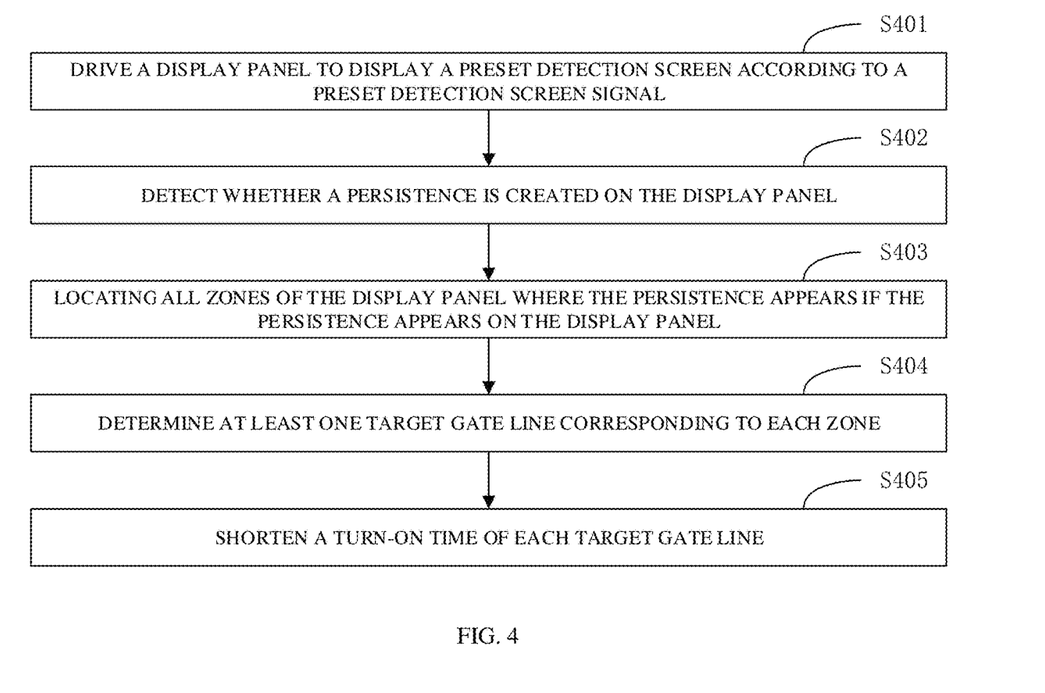
FIG. 4 is a schematic flowchart of a display panel adjustment method provided in a second embodiment of the present disclosure.
Figure 7:
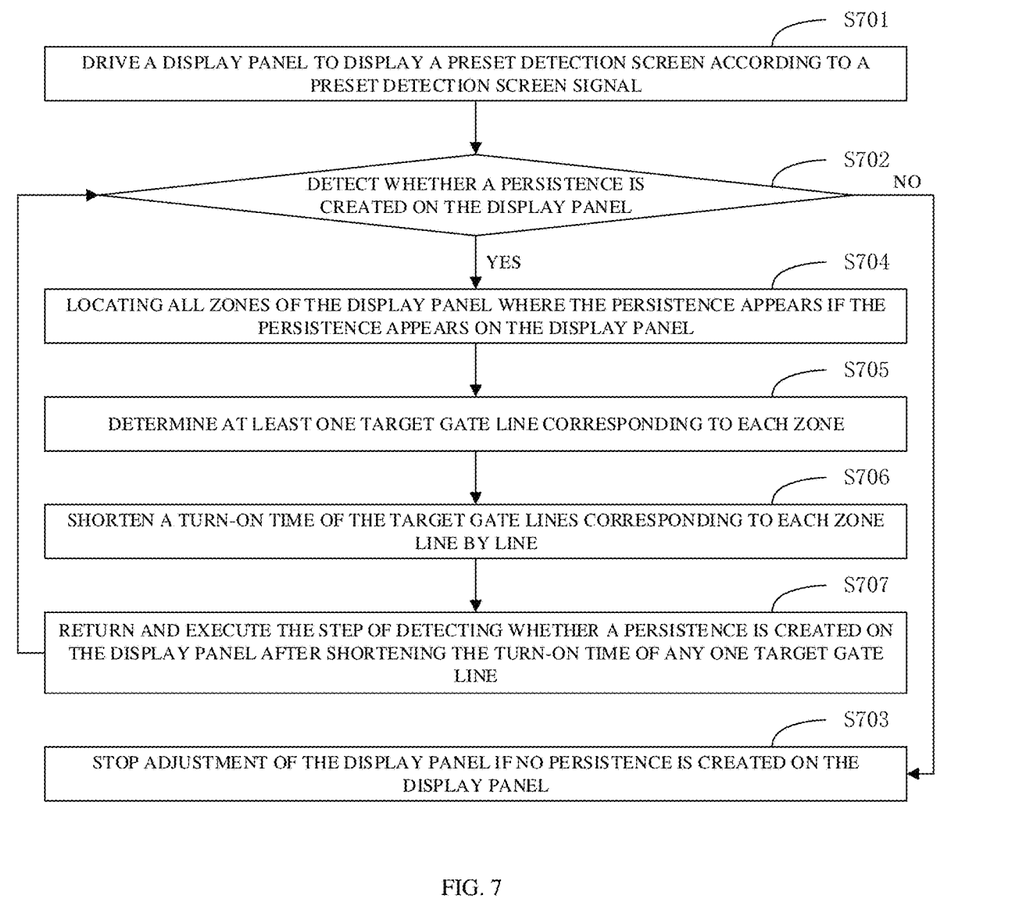
FIG. 7 is a schematic flowchart of a display panel adjustment method provided in a third embodiment of the present disclosure.

As shown in FIG. 1, which is a schematic structural diagram of a display apparatus 1 provided in a first embodiment of the present disclosure, the display apparatus 1 includes a display panel 11, a memory 12, a processor 13, and a computer program 14 stored in the memory 12 and executable on the processor 13;

The memory 12, the processor 13 and the display panel 11 are sequentially connected, and the processor 13, when executing the computer program 14, implements the following steps, which correspond to the display panel adjustment method shown in FIG. 4 and FIG. 7.

In practice, the display apparatus may include, but is not limited to, a processor, a memory, a computer program stored in the memory and executable on the processor, and a display panel. Those skilled in the art may understand that FIG. 1 is merely an example of the display apparatus, and does not constitute a limitation on the display apparatus; and more or fewer components than those illustrated, or some components combined, or different components, may be included, for example, an input/output device, a network access device, and the like, may also be included.

In practice, the processor may be a Timer Control Register (TCON) or a System On Chip (SOC), or may be a Central Processing Unit (CPU), and the processor may also be other general-purpose processor, a Digital Signal Processor (DSP), an Application Specific Integrated Circuit (ASIC), an Field-Programmable Gate Array (FPGA) or other programmable logic devices, discrete gates or transistor logic devices, discrete hardware components, and the like. The general-purpose processor may be a microprocessor or the processor may be any conventional processor or the like.

In practice, the memory may be an internal storage unit of the display apparatus, for example, a hard disk or a memory of the display apparatus in some embodiments. In some other embodiments, the memory may also be an external storage device of the display apparatus, for example, a plug-in hard disk, a Smart Media Card (SMC), a Secure Digital (SD) card, a Flash Card, etc. provided on the display apparatus. Further, the memory may include both an internal storage unit and an external storage device of the display apparatus. The memory is configured to store an operating system, an application, a boot loader, data, and other programs such as a program code of a computer program, and the like. The memory may also be used to temporarily store data that has been output or to be output.

It should be noted that contents such as information interaction between the apparatuses/modules described above and execution processes are of a same concept as the method embodiments of the disclosure, and the specific functions and technical effects brought about may be found in the method embodiments, and the details are not repeated herein.

Figure 2:
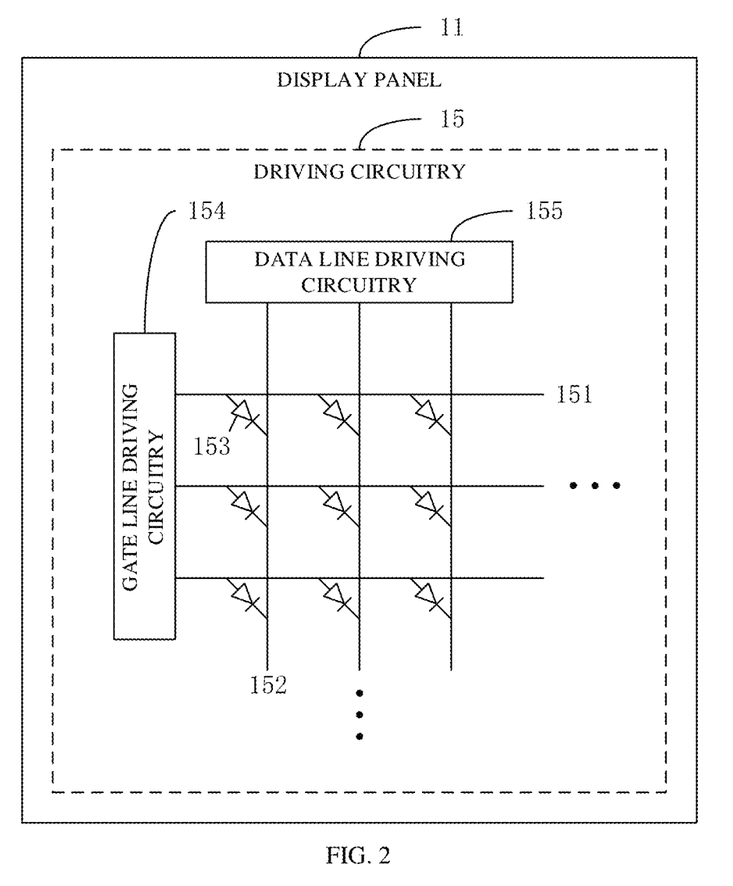
FIG. 2 is a schematic structural diagram of a display panel provided in the first embodiment of the present disclosure.

As shown in FIG. 2, on the basis of the first embodiment corresponding to FIG. 1, the display panel 11 includes a driving circuitry 15, and the driving circuitry 15 includes n gate lines 151, m data lines 152 and n*m light emitting elements 153. An anode of one light emitting element 153 is connected to one gate line 151, a cathode of one light emitting element 153 is connected to one data line 152, each gate line 151 is connected to the anodes of the m light emitting elements 153, and each data line 152 is connected to the cathodes of the n light emitting elements 153.

In one embodiment, the driving circuitry 15 further includes a gate line driving circuitry 154 and a data line driving circuitry 155. The gate line driving circuitry 154 is configured to control each gate line to output a high-level signal or a low-level signal, and the data line driving circuitry 155 is configured to control each data line to output a driving signal or to stop outputting the driving signal. In case where an anode of one light emitting element 153 is receiving a high-level signal and a cathode is receiving a driving signal, and a voltage difference between the anode and the cathode of the light emitting element 153 is greater than a preset forward voltage of the light emitting element 153, the light emitting element 153 turns on and emits light, and the preset forward voltage of the light emitting element 153 is determined according to the type selection and physical characteristics of the light emitting element.

Figure 3:
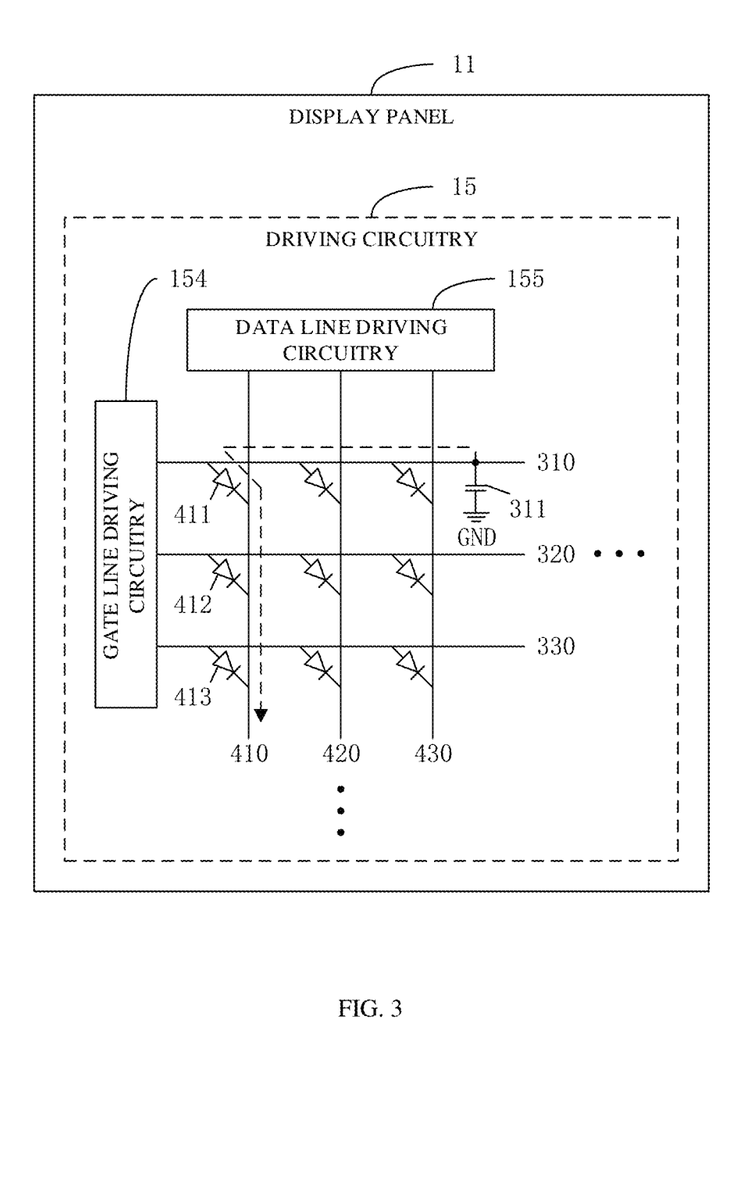
FIG. 3 is a schematic structural diagram of the display panel provided in the first embodiment of the present disclosure where a persistence has been generated.

As shown in FIG. 3, which is a schematic structural diagram of the display panel provided in the first embodiment of the present disclosure where a persistence has been generated, specifically, in case where an output of any gate line (hereinafter, the gate line 310 would be taken as an example) of the driving circuitry 15 of the display panel 15 switches from a high-level signal to a low-voltage signal, the gate line 310 is prone to residual voltage and a parasitic capacitor 311 is formed. If a gate line, whose row number is greater than that of the gate line 310, outputs a high-level signal prior to the discharge of the parasitic capacitor 311, the charge held in the parasitic capacitor 311 may be released through any light emitting element connected to the gate line 310 (hereinafter, the light emitting element 411 would be taken as an example) and its corresponding data line 410 and into the light emitting element 412 and the light emitting element 413 (see the dash line in FIG. 3 for the moving direction of the released charge). The three light emitting elements 411, 412 and 413 should have been switched off in case where the data line 410 does not output a driving signal during the release of the charge, but the three light emitting elements 411, 412 and 413 incorrectly turn on and emit light during the release, such that a persistence is generated on the display panel where should have remained dark, and the display effect is affected.

It should be noted that the schematic diagram of FIG. 3 showing the scenario of persistence is merely exemplary. And according to the working conditions of the data lines and the gate lines, the incorrectly turned on light emitting element may be located on any gate line or on any data line.

In practice, the display panel may be a light emitting diode display panel based on LED (Light-Emitting Diode) technology, an organic laser display panel based on OLED (Organic Light-Emitting Diode) technology, or a quantum dot light emitting diode display panel based on QLED (Quantum Dot Light Emitting Diodes) technology, or a curved display panel, and the type of the light emitting element is determined according to the type of the display panel. For example, in case where the display panel is a light emitting diode display panel, the light emitting element is a light emitting diode or a light emitting diode chip; in case where the display panel is an organic laser display panel, the light emitting element is an organic light emitting diode or an organic light emitting diode chip; and in case where the display panel is a quantum dot light emitting diode display panel, the light emitting element is a quantum dot light emitting diode or a quantum dot light emitting diode chip.

In practice, for a display panel based on LED, OLED, or QLED technology, each light emitting element may be a pixel of the display panel, and each light emitting element may be a red pixel, a green pixel, or a blue pixel according to different colors when lighting, so as to form an RGB color mode (Red-Green-Blue Color Mode).

Second Embodiment

A display panel adjustment method realized in a second embodiment of this disclosure on the basis of the display panel in the first embodiment and its driving circuitry's structure, may detect whether a persistence is created on the display panel by displaying a preset detection screen; and may locate all the zones where the persistence appears if the persistence is created on the display panel, and may determine a target gate line which would probably cause the persistence to appear on the display panel; and by shortening the turn-on time of the target gate line, the method may decrease the probability of a parasitic capacitor being formed on the target gate line, or may decrease the charge held in the parasitic capacitor formed on the target gate line; and may further increase the discharge time of the parasitic capacitor, so as to mitigate or eliminate the persistence, and improve the display effect.

As shown in FIG. 4, the display panel adjustment method provided by the second embodiment of the present disclosure is applied to the driving circuitry of the display panel, and includes the following steps S401 to S405:

At step S401, drive the display panel to display a preset detection screen according to a preset detection screen signal.

In practice, the display panel detection method provided in the embodiments of the present disclosure is used for adjusting one or more to-be-tested display apparatuses before they leave the factory, the memory of a to-be-tested display apparatus may pre-store the preset detection screen, which may be a video file in different formats such as an Microsoft video format (for example, WMV, ASF or ASX), a Real Player format (such as RM or RMVB), an MPEG format (for example, MP4), an Apple format (such as MOV or M4V), and the preset detection screen needs to allow each pixel of the display panel to light up once, so as to increase the accuracy of detecting whether a persistence is created on the display panel.

In practice, the preset detection screen may also be used for controlling each row of pixels to light up row by row, that is, specifically, in case where any row of pixels lights up and turns off, a next row of pixels will light up after a preset time interval, and so on. Thereby, it is possible to detect for each gate line whether it is prone to a residual voltage and a parasitic capacitor is formed when the gate line is switching from outputting a high-level signal to outputting a low-level signal. And the turn-on time and the preset time interval of each row of pixels may be set according to actual testing requirements.

In one embodiment, prior to step S401, the method includes:

establishing a mapping relationship between a display area of the display panel and each gate line.

In practice, the display area of the display panel is composed of the n*m light emitting elements connected by the n gate lines, and may be divided into n zones according to the arrangement of n rows of pixels connected to the n gate lines, with each zone including a corresponding gate line and m pixels connected to the corresponding gate line, so as to establish a mapping relationship between the display area of the display panel and each gate line. After the mapping relationship is obtained, it is possible to determine the row number of the gate lines for displaying a displayed content on the display panel on the basis of the zone(s) where the displayed content is located on the display panel. It should be noted that the display area of the display panel may be divided according to actual needs, and the embodiments of this disclosure constitute no limitation on the number of gate lines included in the display area of each display panel.

At Step S402, detect whether a persistence is created on the display panel.

In practice, it is possible to catch each frame of the preset detection screen displayed on the display panel by a camera equipment, and observe each frame of the preset detection screen for a created persistence; and it is also possible to detect the actual state of the light emitting elements corresponding to each frame of the preset detection screen by a processor and compare the actual state with the predicted state of the light emitting elements, and it will be determined that a persistence is created on the display panel in case where the actual state of the light emitting elements is inconsistent with the predicted state of the light emitting elements; and it will be determined that no persistence is created on the display panel in case where the actual state of the light emitting elements is consistent with the predicted state of the light emitting elements.

Specifically, the state of a light emitting element may include on and off, and the predicted state of the light emitting element may be determined by detecting the working conditions of the data line and the gate line. Specifically, in case where an i-th data line outputs a driving signal and a u-th gate line outputs a high-level signal, it may be determined that the predicted state of the light emitting element in the u-th row and i-th column is on, otherwise, it is determined that the predicted state of the light emitting element in the u-th row and i-th column is off, where i∈[1, 2, . . . , m], and u∈[1, 2, . . . , n]. The actual state of a light emitting element may be determined by detecting a voltage difference between the anode and the cathode of each light emitting element, and in case where the voltage difference between the anode and the cathode of the light emitting element is greater than the preset forward voltage, it is determined that the actual state of the light emitting element is on, and in case where the voltage difference between the anode and the cathode of the light emitting element is smaller than the preset forward voltage, it is determined that the actual state of the light emitting element is off.

In one embodiment, step S402 includes:

detecting whether the persistence is created on the display panel by an image measuring instrument.

In practice, the image measuring instrument may include a camera equipment and an image analysis module, and when the display panel displays the preset detection screen, the image measuring instrument may capture each frame of the preset detection screen displayed on the display panel through the camera equipment, and analyze each frame of the preset detection screen through the image analysis module, to detect whether the persistence has been created on the display panel. By detecting whether the persistence has been created on the display panel through the image measurement instrument, the detection accuracy may be greatly improved.

In the embodiment, the image analysis module may specifically apply an image analysis algorithm established on the basis of Convolutional Neural Networks (CNN), a Region Proposal Network (RPN) or Deformable Parts Models (DPM), etc., to analyze each frame of the preset detection screen.

At step S403, locate all the zones of the display panel where the persistence has appeared in case where the persistence has been created on the display panel, where each zone includes at least one row of pixels.

In practice, in case where a persistence has been created when the display panel displays the preset detection screen, it is possible to locate and store with a memory all the zones where the persistence has appeared on the basis of the display area of the display panel. And it is possible to allow each zone to include at least one pixel in at least one row of pixels because the preset detection screen is displayed with one or more pixels.

At step S404, determine at least one target gate line corresponding to each zone, where the target gate line is used for driving a row of target pixels whose row number is smaller than the minimum row number of all the rows of pixels in the corresponding zone.

In practice, it is possible to determine at least one target gate line corresponding to each zone through the position of each zone in the display area of the display panel. Specifically, it is possible to determine the position of at least one row of pixels included in one zone in the display area of the display panel according to the position of the zone in the display area of the display panel, so as to determine the position of at least one gate line connected with the at least one row of pixels in the display area of the display panel, and then to determine the row number of the at least one target gate line. In this case, the row number of the target gate line is smaller than the minimum row number of the at least one gate line, that is, the target gate line is used for driving one target row of pixels whose row number is smaller than the minimum in the row numbers of all rows of pixels in the corresponding zone.

In one embodiment, step S404 includes:
determining at least one target gate line corresponding to each zone according to each zone and the mapping relationship.

In practice, it is possible to quickly obtain at least one target gate line corresponding to each zone by putting each zone into the mapping relationship. For example, assuming that n is greater than 5, each display zone resulted from the division of the display panel includes one gate line, the row numbers of the gate lines included in each display area are different from each other, and the zones where the persistence has appeared on the display panel include the first, third and fifth zones, by putting the first, third and fifth zones into the mapping relationship, it is easily determined that the target gate lines include the first, third and fifth gate lines.

At step S405, shorten the turn-on time of each target gate line.

In practice, the state of a target gate line may include on and off, and the state is on when the target gate line outputs a high-level signal and the state is off when the target gate line outputs a low-level signal. By shortening the turn-on time of each target gate line, it is possible to decrease the probability of a parasitic capacitor being formed on the target gate line, or to decrease the charge held in the parasitic capacitor formed on the target gate line, and it is also possible to increase the discharge time of the parasitic capacitor, thereby mitigating or eliminating the persistence. In the case, discharge means that the parasitic capacitor discharges the held charge to the air or to the ground terminal; and the release of charge means that the parasitic capacitor releases the held charge into electronic components or the data lines of the driving circuitry, which would probably result in a persistence on the display panel.

It should be noted that, after shortening the turn-on time of each target gate line, the turn-on time of any one target gate line needs to be greater than or equal to the longest display time of the m light emitting elements connected to the any one target gate line, so as to ensure that the m light emitting elements connected to the target gate line may normally display. In this case, the longest display time of the m light emitting elements connected to the any one target gate line is determined according to the duration of the driving signals output by the m data lines, and the longest display time of the m light emitting elements may be equal to the longest duration of the driving signals output by the m data lines.

Figure 5:
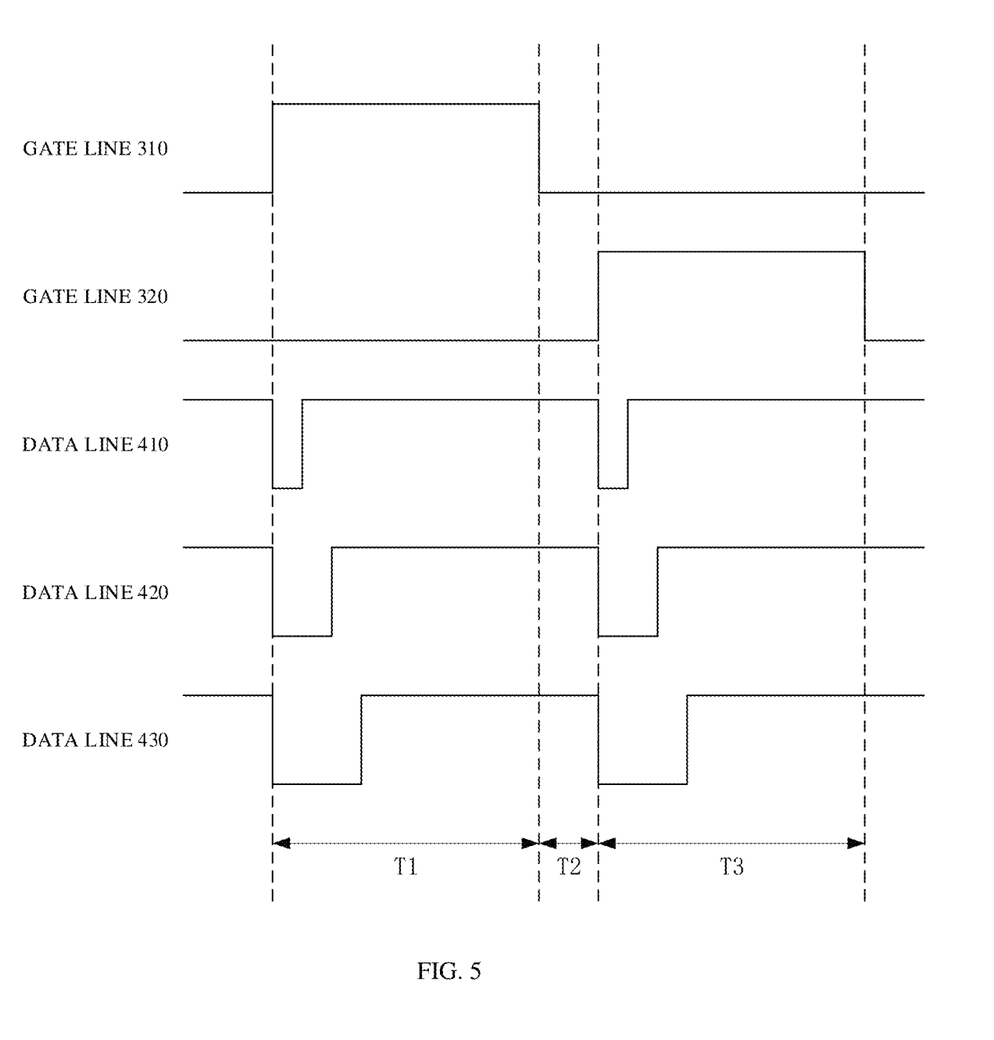
FIG. 5 shows schematic timing diagrams of data lines and gate lines in case where a persistence has been generated on the display panel, as provided in the second embodiment of the present disclosure.

As an example, FIG. 5 shows schematic timing diagrams of the data lines and the gate lines in case where a persistence has been generated on the display panel on the basis of the schematic structural diagram shown in FIG. 3 of the first embodiment. Specifically, the gate line 310 turns on during time period T1, the gate line 320 turns on during time period T3, and there is a preset time interval T2 between the turning off of the gate line 310 and the turning on of the gate line 320. The gate line 310 outputs a high-level signal during time period T1, and a parasitic capacitor is formed and is continuously charged during time period T1. In case where the parasitic capacitor fails to complete discharge during the preset time interval T2, the charge held in the parasitic capacitor may be released to any one of the light emitting elements connected to the gate line 310 and to the data lines corresponding to the light emitting element when the data line 320 turns on when entering into time period T3, resulting in a persistence on the display panel.

Figure 6:
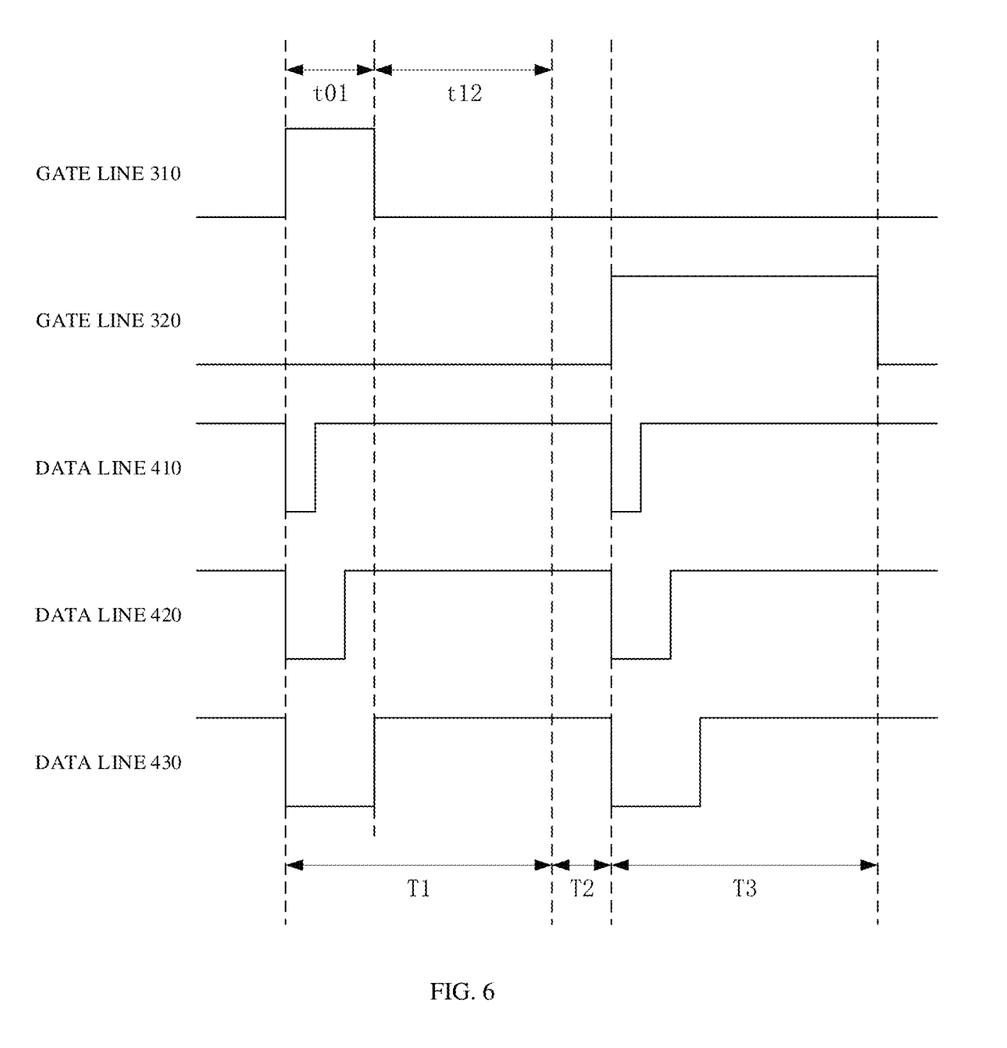
FIG. 6 shows schematic timing diagrams of data lines and gate lines in case where the turn-on time of a target gate line is shortened, as provided in the second embodiment of the present disclosure.

As an example, FIG. 6 shows schematic timing diagrams of the data lines and the gate lines in case where the turn-on time of the target gate line is shortened on the basis of the schematic structural diagram shown in FIG. 3 of the first embodiment. Specifically, the gate line 310 is adjusted to turn on during time period t01 and turn on during time period t12 rather than turning on during time period T1, such that the turn-on time of the gate line 310 is shortened, and the parasitic capacitor formed on the gate line 310 during time period t01 may be discharge during time period t12 and time period T2. The discharge time of the parasitic capacitor on the gate line 310 is increased, and the persistence is mitigated or eliminated. In this case, assuming that the longest duration of the driving signals output by the m data lines is t01, the turn-on time of the gate line 310 needs to be greater than or equal to t01 when shortening the turn-on time of the gate line 310, so as to ensure that the m light emitting elements connected to the gate line 310 may normally display; and T1=t01+t12.

In one embodiment, step S405 includes:
shortening the turn-on time of each target gate line to a corresponding preset duration.

In practice, it is possible to arrange a corresponding preset duration for each gate line and establish a preset duration correspondence table. In case where any one or more gate lines are determined as target gate lines, a corresponding preset duration may be obtained for each target gate line by retrieving the preset duration correspondence table, so that the turn-on time of each target gate line may be shortened quickly according to the preset duration, and the adjustment efficiency is improved. In the case, the preset duration may be the longest display time of the m light emitting elements connected to the corresponding target gate line; the preset duration may also be set according to actual adjustment requirements, and the embodiments of this disclosure constitute no limitation on the specific preset duration.

The display panel adjustment method provided in the second embodiment of this disclosure may detect whether a persistence is created on the display panel by displaying a preset detection screen; and may locate all the zones where the persistence appears if the persistence is created on the display panel, and may determine a target gate line which would probably cause the persistence to appear on the display panel; and by shortening the turn-on time of the target gate line, the method may decrease the probability of a parasitic capacitor being formed on the target gate line, or may decrease the charge held in the parasitic capacitor formed on the target gate line; and may further increase the discharge time of the parasitic capacitor, so as to mitigate or eliminate the persistence, and improve the display effect.

Third Embodiment

As shown in FIG. 7, on the basis of the second embodiment corresponding to FIG. 4, a third embodiment of the present disclosure includes the following steps S701 to S707:

At step S701, drive the display panel to display a preset detection screen according to a preset detection screen signal;

At step S702, detect whether a persistence is created on the display panel;

At step S703, stop adjustment of the display panel in case where no persistence has been created on the display panel;

At step S704, locate all the zones of the display panel where the persistence has appeared in case where the persistence has been created on the display panel, where each zone includes at least one row of pixels;

At step S705, determine at least one target gate line corresponding to each zone, where each target gate line is used for driving a row of target pixels whose row number is smaller than the minimum row number of all the rows of pixels in the corresponding zone;

At step S706, shorten the turn-on time of the target gate lines corresponding to each zone line by line;

At step S707: return to and execute the step of detecting whether a persistence is created on the display panel after shortening the turn-on time of any one target gate line, proceeding to step S702.

In practice, the difference between the third embodiment and the second embodiment lies in that step S703 is further included after step S402 (S702), step S405 includes step S706, and step S707 is further included after step S706. In the following step S703, step S706, and step S707 are described.

With regard to step S703, in practice, in case where no persistence has been created on each frame of the preset detection screen displayed on the display panel, the display panel is determined to be working normally, and it is determined to stop the display panel adjustment and exit the loop.

With regard to step S706 and step S707, in practice, it is possible to shorten the turn-on time of the target gate lines corresponding to each zone line by line, and return to and execute the step of detecting whether a persistence is created on the display panel after shortening the turn-on time of any one target gate line, so as to detect for each target gate line whether it has resulted in the persistence, thereby it is possible to accurately determine the row number of the target gate line(s) which has resulted in the persistence, and perform a targeted adjustment on the target gate line(s) as practically required, thereby improving the pertinence and accuracy of the adjustment.

In one embodiment, step S706 includes:
shortening the turn-on time of the target gate lines corresponding to each zone line by line in reverse order of their row numbers.

In practice, when the parasitic capacitor is releasing the held charge, each of
the light emitting elements through which the released charge has passed, would probably turn on and light up, and the closer a target gate line is to the zone where the persistence appears, the higher the probability of the target gate line results in the persistence. It should be noted that the larger the row number of a target gate line, the closer the target gate line is to the zone where the persistence appears. Therefore, by shortening the turn-on time of the target gate lines corresponding to each zone line by line in reverse order of their row numbers, it is possible to increase the probability of determining the target gate line(s) causing the persistence, so as to improve the adjustment efficiency.

By detecting whether a persistence is created on the display panel after shortening the turn-on time of any one target gate line, the display panel adjustment method provided in the third embodiment of this disclosure may accurately locate the target gate line(s) resulting the persistence, thereby improving the adjustment accuracy.

It should be understood that the reference number of the steps in the above embodiments does limit the execution order of the procedures, which should be determined by the function and internal logic, and should not constitute any limitation on the implementation process of the embodiments of this disclosure.

The embodiments of this disclosure further provide a computer-readable storage medium storing a computer program, which, when executed by a processor, execute the steps in each of the above display panel adjustment method embodiments.

When an integrated module is implemented in the form of a software functional module and sold or used as an independent product, the integrated module may be stored in a computer-readable storage medium. Based on such understanding, the present disclosure implements all or part of the processes in the above method embodiments, which may be completed by instructing related hardware by means of a computer program. The computer program may be stored in a computer-readable storage medium and implement the steps of the foregoing method embodiments when being executed by a processor. The computer program includes a computer program code, and the computer program code may be in the form of a source code, an object code, an executable file, or some intermediate form, etc. The computer-readable medium may at least include any entity or device capable of carrying computer program code to a photographing terminal device, a recording medium, a computer memory, a read-only memory (ROM), a random access memory (RAM), an electrical carrier signal, a telecommunication signal, and a software distribution medium, for example, a USB flash disk, a mobile hard disk, a magnetic disk, or an optical disk, etc.

In the above embodiments, the description of each embodiment has its own emphasis. For some of the embodiments that are not described in detail or recited, related description of other embodiments may be referred to.

Those skilled in the art may realize that the exemplary modules and algorithm steps described in connection with the embodiments disclosed herein may be implemented with electronic hardware, or a combination of computer software and electronic hardware. Whether the functions are performed by hardware or software depends on the specific application and designed constraint conditions of the technical solutions. Those skilled in the art may use different methods to implement the described functions for each specific application, but such implementation should not be considered as going beyond the scope of the present disclosure.

In the embodiments provided in this disclosure, it should be understood that the disclosed terminal device and method may be implemented in other manners. For example, the terminal device embodiments described above are merely illustrative, for example, the division of the module is merely a logical function division, and there may be other division manner during actual implementation, for example, multiple modules or components may be combined or may be integrated into another system, or some features may be ignored or not performed. In addition, the mutual coupling or direct coupling or communication connection shown or discussed may be an indirect coupling or communication connection through some interfaces, apparatuses, or modules, and may be electrical, mechanical, or other forms.

The above-mentioned embodiments are merely intended for describing but not for limiting the technical solutions of the present disclosure. Although the present disclosure is described in detail with reference to the above-mentioned embodiments, it should be understood by those skilled in the art that, the technical solutions recited in each of the above-mentioned embodiments may still be modified, or some of the technical features may be equivalently replaced, while these modifications or replacements do not make the essence of the corresponding technical solutions depart from the spirit and scope of the technical solutions of each of the embodiments of the present disclosure, and should be included within the scope of the present disclosure.

What is claimed is:

1. A display panel adjustment method, comprising:
    driving a display panel to display a preset detection screen;
    detecting whether a persistence of light radiation is created on the display panel;
    locating all zones of the display panel where the persistence of light radiation has appeared in a case where the persistence of light radiation has been created on the display panel, wherein each of the zones includes at least one row of pixels;
    determining at least one target gate line corresponding to each of the zones, wherein each target gate line is used for driving a row of target pixels whose row number is smaller than a minimum row number of all rows of pixels in the corresponding zone; and
    shortening a turn-on time of each target gate line.

2. The display panel adjustment method according to claim 1, wherein said detecting whether a persistence of light radiation is created on the display panel comprises:
    detecting whether the persistence of light radiation is created on the display panel by an image measuring instrument.

3. The display panel adjustment method according to claim 2, wherein the image measuring instrument comprises camera equipment and an image analysis module, and said detecting whether the persistence of light radiation is created on the display panel by an image measuring instrument comprises:
    capturing each frame of the preset detection screen displayed on the display panel through the camera equipment, and analyzing each frame of the preset detection screen through the image analysis module to detect whether the persistence of light radiation is created on the display panel.

4. The display panel adjustment method according to claim 1, wherein said detecting whether a persistence of light radiation is created on the display panel comprises:
    detecting an actual state of a light emitting element corresponding to each frame of the preset detection screen;
    determining that the persistence of light radiation is created on the display panel in case where the actual state of the light emitting element is inconsistent with a predicted state of the light emitting element; and
    determining that no persistence of light radiation is created on the display panel in case where the actual state of the light emitting element is consistent with the predicted state of the light emitting element.

5. The display panel adjustment method according to claim 1, wherein prior to said driving a display panel to display a preset detection screen, the method comprises:
    establishing a mapping relationship between a display area of the display panel and each gate line.

6. The display panel adjustment method according to claim 5, wherein said determining at least one target gate line corresponding to each of the zones comprises:
    determining at least one target gate line corresponding to each of the zones according to each of the zones and the mapping relationship.

7. The display panel adjustment method according to claim 1, wherein said shortening of a turn-on time of each target gate line comprises:
    shortening the turn-on time of the target gate lines corresponding to each of the zones line by line.

8. The display panel adjustment method according to claim 7, wherein said shortening of the turn-on time of the target gate lines corresponding to each of the zones line by line comprises:
    shortening the turn-on time of the target gate lines corresponding to each of the zones line by line in reverse order of row numbers of the target gate lines.

9. The display panel adjustment method according to claim 7, further comprising:
    returning to and executing a step of detecting whether a persistence of light radiation is created on the display panel after shortening the turn-on time of any one of the target gate lines; and
    stopping adjustment of the display panel in case where no persistence of light radiation has been created on the display panel.

10. The display panel adjustment method according to claim 9, wherein said stopping adjustment of the display panel in a case where no persistence of light radiation has been created on the display panel comprises:
    stopping adjustment of the display panel in case where no persistence of light radiation has been created on each frame of the preset detection screen displayed on the display panel.

11. The display panel adjustment method according to claim 1, wherein said shortening a turn-on time of each target gate line comprises:
    shortening the turn-on time of each target gate line to a corresponding preset duration.

12. A display apparatus comprising a display panel, a memory, a processor, and a computer program stored in the memory and executable on the processor;
    the memory, the processor and the display panel are sequentially connected, and the processor, when executing the computer program, implements steps of the display panel adjustment method according to claim 1.

13. The display apparatus according to claim 12, wherein the display panel comprises driving circuitry, and the driving circuitry comprises n gate lines, m data lines and n*m light emitting elements, an anode of one of the light emitting elements is connected to one of the gate lines, a cathode of one of the light emitting elements is connected to one of the data lines, each of the gate lines is connected to the anodes of the m light emitting elements, and each of the data lines is connected to the cathodes of the n light emitting elements.

14. The display apparatus according to claim 13, wherein the driving circuitry further comprises a gate line driving circuitry and a data line driving circuitry;
   the gate line driving circuitry is configured to control each of the gate lines to output a high-level signal or a low-level signal; and
   the data line driving circuitry is configured to control each of the data lines to output a driving signal or to stop outputting the driving signal;
   wherein, in a case where the anode of one of the light emitting elements is receiving the high-level signal and the cathode of the one of the light emitting elements is receiving the driving signal, and a voltage difference between the anode and the cathode of the one of the light emitting elements is greater than a preset forward voltage of the one of the light emitting elements, the one of the light emitting elements turns on and emits light.

15. A non-transitory computer-readable storage medium storing a computer program, the computer program, when executed by a processor, causes the processor to implement steps of the display panel adjustment method according to claim 1.

\* \* \* \* \*